INVENTOR.
WILHELMUS G. KUIPER
BY
Frank R. Trifari
AGENT

INVENTOR.
WILHELMUS G. KUIPER
BY
Frank R. Trifari
AGENT

INVENTOR.
WILHELMUS G. KUIPER
BY
[signature]
AGENT

United States Patent Office 3,440,564
Patented Apr. 22, 1969

3,440,564
ASTABLE RELAXATION OSCILLATOR INCLUDING A BILATERAL LIMITER IN THE OUTPUT CIRCUIT

Wilhelmus Gerardus Kuiper, Hilversum, Netherlands, assignor, by mesne assignments, to U.S. Philips Corporation, New York, N.Y., a corporation of Delaware Filed May 15, 1967, Ser. No. 638,363
Claims priority, application Netherlands, May 14, 1966, 6606653
Int. Cl. H03k 3/16, 3/30
U.S. Cl. 331—112 16 Claims

ABSTRACT OF THE DISCLOSURE

An astable relaxation oscillator is provided having a transistor connected in a common base circuit. A transformer is connected with its primary winding in the collector circuit and its secondary winding in the emitter circuit, in order to provide positive feedback. A bilateral limiter is connected in parallel with the primary winding.

This invention relates to circuits including a transistor connected as an astable relaxation generator, in which the collector circuit includes a series-coil which is inductively backcoupled to a circuit of an input electrode of the transistor by means of a coupling coil.

For some uses circuits of this type have practical difficulties which are caused, on the one hand, by the structure of the astable relaxation generator and, on the other hand by the dependence and the operation of the circuit upon the properties of the transistor. Thus, for example, when using such an astable relaxation generator as a frequency divider, the oscillations obtained by frequency division are found to exhibit phase jitter. In case of great factors of frequency division, for example greater than 10, it is also not certain that the frequency is divided by the correct factor of division.

An object of the invention is to provide a circuit of the above described kind in which the following advantages are obtained in combination:

(1) Simple structure (2) Great independence of the properties of the transistor (3) High stability of frequency (4) Considerable output without any appreciable effect on the frequency stability.

When used as a frequency divider there are, in addition, the following advantages:

(5) Locked phase relationship of the oscillations obtained by division (6) The possibility of great factors of division, for example, greater than 20

(7) Simple selection.

According to the invention the series-coil included in tne collector circuit of the transistor is shunted by a bilateral voltage limiter which limits the voltage across the series-coil in the collector circuit to a given maximum value and a given minimum value. The circuit of the input electrode of the transistor includes a series-resistor which serves as a current limiter.

In order that the invention may be readily carried into effect it will now be described in detail, by way of example, with reference to the accompanying diagrammatic drawings, in which.

Figures 1, 2:
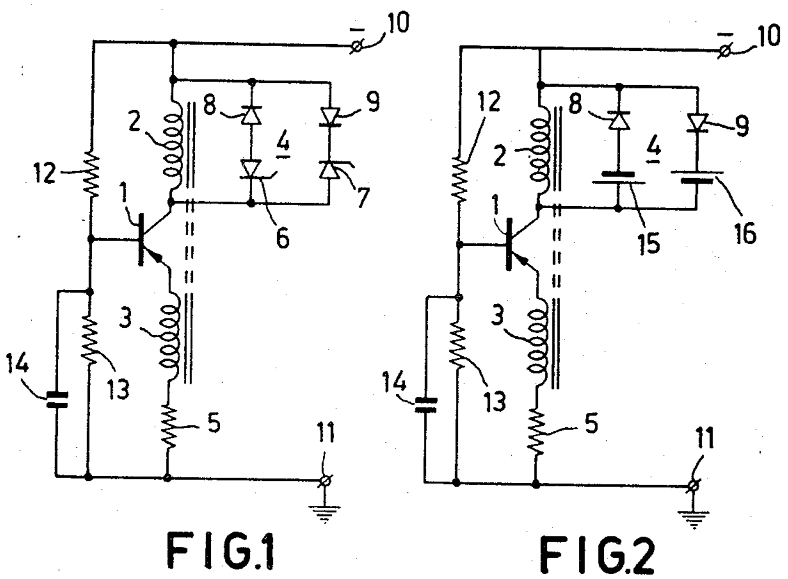
FIGURE 1 shows an arrangement according to the invention the operation of which is clarified by the substitution diagram shown in FIGURE 2 and several time diagrams shown in FIG. 3.

The arrangement according to the invention as shown in FIG. 1 includes a transistor 1 in common base connection which is circuited as an astable relaxation generator and the collector circuit of which is positively backcoupled to the emitter circuit. In the specified relaxation generator the collector circuit of the transistor includes a series-coil 2 which is positively backcoupled to the emitter circuit of transistor 1 by means of a feedback coil 3.

According to the invention, in order to obtain an astable relaxation generator which is of a very simple structure and largely independent of the properties of the transistor, the series-coil 2 included in the collector circuit of transistor 1 is shunted by a bilateral voltage limiter 4 which limits the voltage across the series-coil 2 in the collector circuit to a given maximum value and a given minimum value. The emitter circuit includes, in series with the feedback coil 3, a series-resistor 5 which serves as a current limiter. In the embodiment of FIG. 1 the bilateral voltage limiter is formed by two parallel branches including Zener diodes 6 and 7 having relatively opposite pass directions, and ordinary diodes 8 and 9 connected in series with the Zener diodes 6 and 7 with polarities to block forward current flow in the Zener diodes. The transistor 1 is biased to a given direct current by means of a voltage divider placed between supply voltage terminals 10 and 11, which is connected to the base and is constituted by resistors 12, 13 and a bypass capacitor 14.

FIG. 2 shows the equivalent diagram of the arrangement of FIG. 1, in which the bilateral voltage limiter 4 is formed by the diodes 8 and 9 which are biassed by biassing sources 15 and 16 of opposite polarities +E and —E, said biassing potentials corresponding to the Zener voltages of the Zener diodes 6 and 7. Thus the bilateral limiter 4 will limit the voltage across the series-coil 2 in the collector circuit to the maximum value +E and the minimum value —E.

Figure 3:
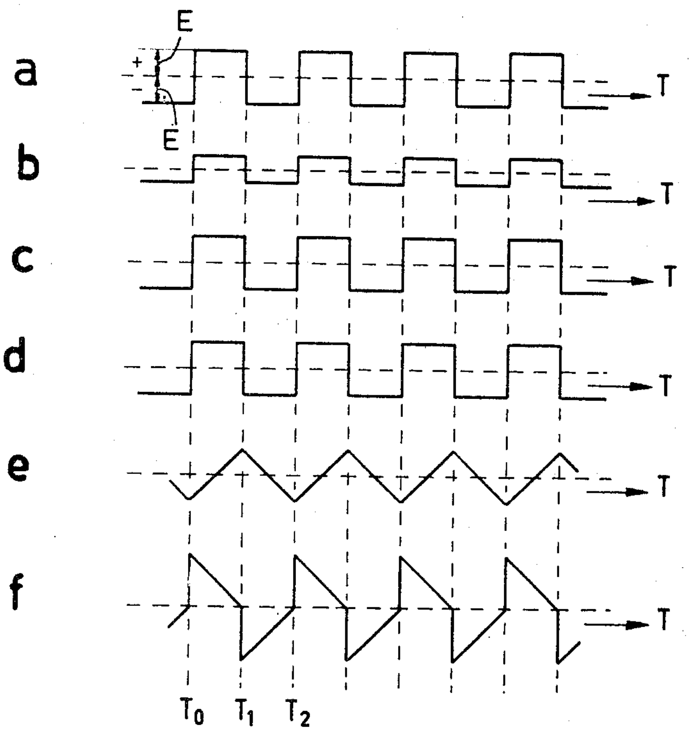

The operation of the relaxation generator so far described will now be explained further with reference to the time diagrams shown in FIG. 3.

The arrangement shown has two unstable conditions, the relaxation generator switching from one condition to the other. As a result of the bilateral limiter 4 a voltage +E appears across the series-coil 2 in one condition and a voltage —E in the other condition. The voltage across the series-coil 2 has, for example, the waveform shown in FIG. 3*a*.

The feedback voltage shown in FIG. 3*b*, the value of which is determined by the transformation ratio of the series-coil 2 to the feedback coil 3, is included in the emitter circuit of transistor 1 via the feedback coil 3. Thus a current will flow in the emitter circuit of transistor 1. This current is equal to the induced emitter voltage divided by the current limiting resistor 5 and has a waveform as shown in FIG. 3*c*. A collector current will flow in the collector circuit, which is determined by the emitter current multiplied by the current gain factor $\alpha$ of the transistor 1.

Thus the square wave collector current shown in FIG. 3*d* will flow in the collector circuit of the transistor, said collector current being divided between the series-coil 2 and the bilateral limiter 4 connected in parallel therewith, since on account of its inductance, the series-coil 2 is incapable, of directly absorbing the abrupt variations occurring in the collector current. When starting, for example, from the instant $T_0$ at which the collector current passes from its minimum value to its maximum value, the current flow through the series-coil, as shown in FIG. 3*e*, will increase linearly at a rate determined by the value of the inductance of the series-coil 2, while the remaining portion of the collector current is absorbed by the bilateral limiter 4 and then has the waveform shown in FIG. 3*f*.

At the instant $T_1$ all of the collector current flows through the series-coil 2 so that the current flow in it can no longer increase with the result that the voltage across the series-coil 2 will decrease, since the voltage across the coil 2 is given by its inductance multiplied by the current variation per unit time. The decrease of voltage in the series-coil 2 thus initiates the relaxation process. In fact, the voltage induced in the emitter circuit via the feedback coil 3 will thus decrease and hence the emitter current and the collector current, which decrease in collector current supports the decrease in voltage across the series-coil 2 until this voltage has reached the minimum limit value —E of the bilateral voltage limiter 4.

The transistor then conveys, as shown in FIG. 3*d*, its minimum collector current so that the current flow in the series-coil 2 will progressively decrease and the current flow through the bilateral limiter 4 will have the waveform shown in FIG. 3*f*. At the instant $T_2$ the total collector current is absorbed by the series-coil 2 so that the relaxation generator switches to its unstable condition with maximum collector current and the cycle described hereinbefore is repeated. During the relaxation process the transistor continues to pass collector current without the transistor being saturated or blocking phenomena occurring.

The described relaxation process is based, as has been described hereinbefore, upon the division of the current between the series-coil 2 and the non-linear element in the form of the bilateral voltage limiter 4 which is connected in parallel therewith, without use being made of the properties of the transistor 1, such as, for example, blocking or saturating of transistor 1. This independence of the properties of the transistor is improved still further due to the common base connection of transistor 1, since the current gain factor $\alpha$ from the emitter to the collector, which is important for the relaxation process, is in practice equal to unity in modern type transistors.

The great independence of the properties of the transistor is illustrated most clearly by the formula of the relaxation frequency F of the relaxation generator:

$$F=\frac{n^2}{4(n-1)}\frac{R}{L}$$

where L is the value of the inductance of the series-coil 2, *n* is the transformation ratio of the series-coil 2 to the feedback coil 3, and R is the value of the current limiting resistor 5 in the emitter circuit.

It appears from this formula, that on the one hand the relaxation frequency depends only upon the passive magnitudes L, *n* and R so that the relaxation generator has optimum stability of frequency and, on the other hand, the relaxation frequency is independent of the limit level, that is to say the frequency stability is not affected by a high limit level and hence a high output. Thus, for example, in a carrier telephone system, the described relaxation generator provides the carrier frequency for 20 ring modulators at a time.

Apart from the advantages described herein before, namely simple structure, great independence of the properties of the transistor, optimum stability of frequency, the described relaxation generator affords important advantages when used as a frequency divider, as will now be explained more fully with reference to FIG. 4.

Figure 4:
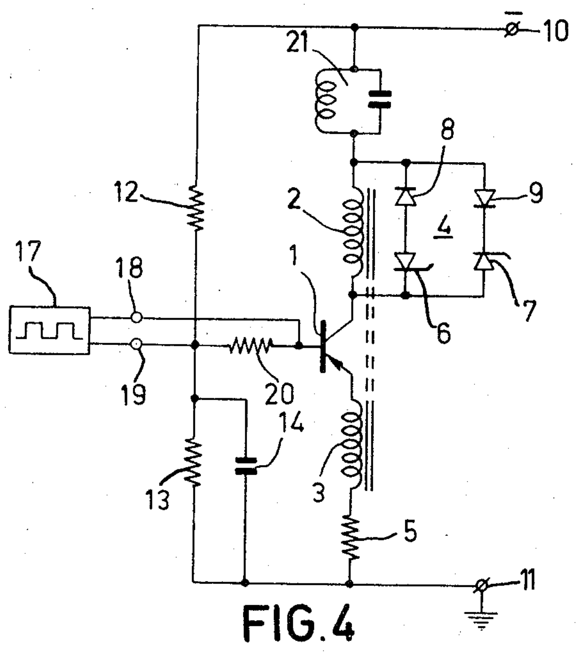
FIGURE 4 shows an arrangement according to the invention which is designed as a frequency divider, the operation of which is clarified by several time diagrams shown in FIGURE 5.

The object of the arrangement shown in FIG. 4 is to divide the frequency of a generator 17, which provides a square wave voltage, by a factor of, for example, 5. For this purpose, output terminals 18 and 19 of the generator 17 are connected to a series-resistor 20 included in the base circuit of the transistor 1 which is connected as a relaxation generator in the manner shown in FIG. 1. The relaxation generator has a relaxation frequency about one fifth of the frequency of the generator 17. Elements identical with those of FIG. 1 are indicated by the same reference numerals.

Figure 5:
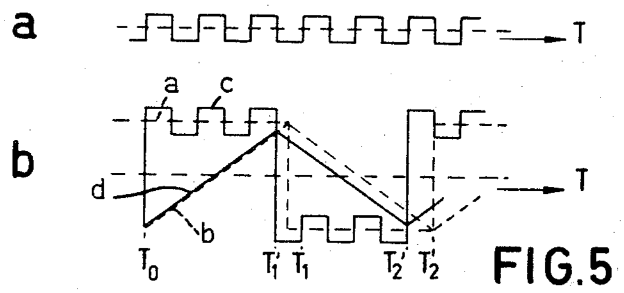

The operation of the frequency divider described will now be explained more fully with reference to the time diagrams shown in FIG. 5.

FIG. 5*a* shows the oscillations produced by the generator 17 and in FIG. 5*b* the broken-line curve *a* illustrates the collector current of the relaxation generator and the broken-line curve *b* illustrates the current flow through the series-coil in the absence of the generator 17.

As has been explained hereinafter, in the absence of the generator 17, the relaxation generator will switch from one unstable condition to the other at the instants $T_1$ and $T_2$ at which the total collector current is absorbed by the series-coil 2, that is to say at the instants of intersection of the curves *b* and *a*.

If, now, the generator 17 is connected to the relaxation generator, the signal from the generator 17 is superimposed as a synchronizing signal on the collector current of transistor 1 and the collector current has the waveform illustrated by the full-line curve *c* in FIG. 5*a*, whereas the full-line curve *d* illustrates the current flow through the series-coil 3. Similarly as hereinbefore, the relaxation generator will switch from one unstable condition to the other at the instants of intersection $T_1'$ and $T_2'$ of the curves *d* and *c*, which takes place alternately on the descending edge and the rising edge of the synchronizing signal, as illustrated in the figure.

On the one hand, in this arrangement, as shown in FIG. 5*a* the instants of switching of the relaxation generator, that is to say the transition from minimum to maximum collector current and conversely from maximum to minimum collector current, are locked with the synchronizing signals in rigid phase relationship so that phase jitter in the oscillations produced by the relaxation generator are completely avoided. On the other hand, the switching instants of the relaxation generator are determined alternately by the descending edge and the rising edge so that in the first instance the relaxation generator can perform only a frequency division by an odd factor of division. Thus, even in case of very great factors of division, for example, greater than 20, there is no risk of shifting to an adjacent unwanted factor of division, and the divided frequency desired is selected in a simple manner by means of a tuned circuit 21 included in the collector circuit, since the frequency spectrum of the relaxation oscillations contains, in addition to the fundamental frequency, only odd harmonics due to the symmetrical waveform of the relaxation oscillation produced.

All these advantages obtained with frequency division, namely avoidance of phase jitter, great factors of division without a risk of wrong division, simple possibility of selection, together with a simple and surveyable structure, render the described relaxation generator particularly useful in practice when used as a frequency divider.

Figure 6:
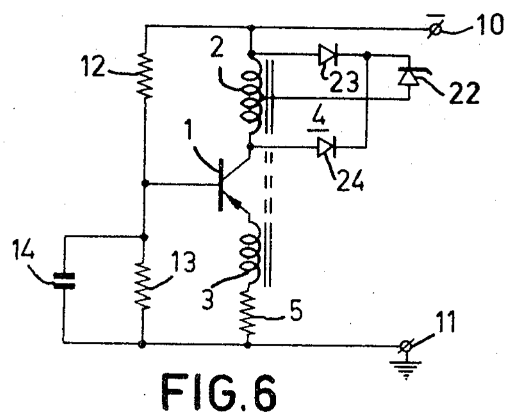
FIGURE 6 shows a variation of the arrangement of FIG. 1.

FIG. 6 shows a variation of the relaxation generator of FIG. 1 in which corresponding elements are indicated by the same reference numerals. It is of special advantage, as has been explained hereinbefore, that the relaxation generator produces a relaxation oscillation of symmetrical waveform, which is achieved by choosing Zener diodes 6 and 7 which match each other and have substantially the same Zener voltages so that the two limit levels of opposite polarities are relatively the same in magnitude.

In the embodiment shown in FIG. 6, the choice of Zener diodes which match each other to obtain a relaxation oscillation of symmetrical waveform is obviated by using a limiter design as shown whereby the two limit levels of the bilateral limiter 4 are determined by a single Zener diode 22. More particularly the two ends of the series-coil 2 are connected together via diodes 23 and 24 having the same pass directions and are connected to a center tap on the series coil 2 via the Zener diode 23.

If, in this arrangement, the voltage on the series-coil 2 has its maximum value the diode 24 is cut-off and the diode 23 conducts, whereas if the voltage on the series coil 2 has its minimum value the diode 23 is cut-off and the diode 24 conducts, the limit level in either case being determined by the voltage on the Zener diode 22 which is connected to a center tap on the series-coil 2. Both limit levels of the bilateral limiter 4 are determined in this case by the single Zener diode 22, but for obtaining a symmetrical relaxation oscillation the Zener diode 22 must be accurately connected to the center of the series-coil 2.

Figure 7:
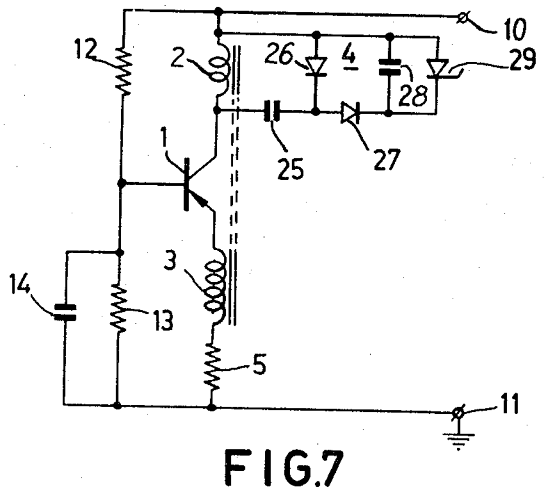
FIG. 7 shows an embodiment of the arrangement according to the invention which is particularly interesting in practice.

FIG. 7 shows a very advantageous variation of the arrangements of FIGS. 1 and 6. In the arrangement of FIG. 7 it is not necessary to employ matching Zener diodes, as in the arrangement of FIG. 1, and connections to the center of a series-coil in order to obtain symmetrical relaxation oscillations are not necessary.

In the illustrated arrangement the bilateral limiter 4 is formed by the series-combination of a first capacitor 25 and a first diode 26, which shunts the series-coil 2 in the collector circuit of transistor 1, and the series combination of a second diode 27 and a second capacitor 28, which is connected in parallel with the first diode 26, the second capacitor 28 being shunted by a Zener diode 29. The diodes 27, 26 and the capacitors 25, 28 are connected in the manner of a voltage-doubling device, the direct voltages produced across the capacitors 25, 28 by rectification forming the biassing potentials of the diodes 26 and 27 which also act as the limiter. More particularly there arises, as viewed from the series-coil 2, a voltage +E across the capacitor 25 and the double voltage of opposite polarity −2E across the capacitor 28, the said two voltages being stabilized due to the volatge across capacitor 28 being stabilized by the Zener voltage of the Zener diode 29 connected in parallel with capacitor 28.

In this arrangement, in the unstable condition with maximum voltage across the series-coil 2, the diode 27 will be cut-off and the diode 26 included in the circuit: series-coil 2, capacitor 25, diode 26 will conduct, the limit level being determined by the voltage +E of capacitor 25, whereas in the unstable condition with minimum voltage across the series-coil 2 the diode 26 will be cut-off and the diode 27 included in the circuit: series-coil 2, capacitor 25, diode 27, capacitor 28 will conduct, the limit level being determined by the sum of the voltages across the capacitors 25 and 28, which are +E and −2E respectively. Thus the voltage across the series-coil 2 is limited to the maximum value +E and the minimum value −E, the operation of the arrangement of FIG. 7 being similar to that which has already been explained, for example, with reference to FIG. 2.

In an arrangement having a relaxation frequency of 32 kc./s. which has been extensively tested in practice, the following components were employed:

| | | |
|---|---|---|
| Transistor | | BFY 55 |
| Coil **2** | mh | 7.9 |
| Resistor **5** | | 91Ω |
| Resistor **12** | | 20KΩ |
| Resistor **13** | | 500Ω |
| Capacitor **14** | μf | 1 |
| Transformation ratio *n* between the coils **2, 3** | | 9.65 |
| Diodes **26, 27** | | BAY 38 |
| Zener diode **29** | | BZY 63 |
| Capacitors **25, 28** (each) | μf | 2.2 |

Figure 8:
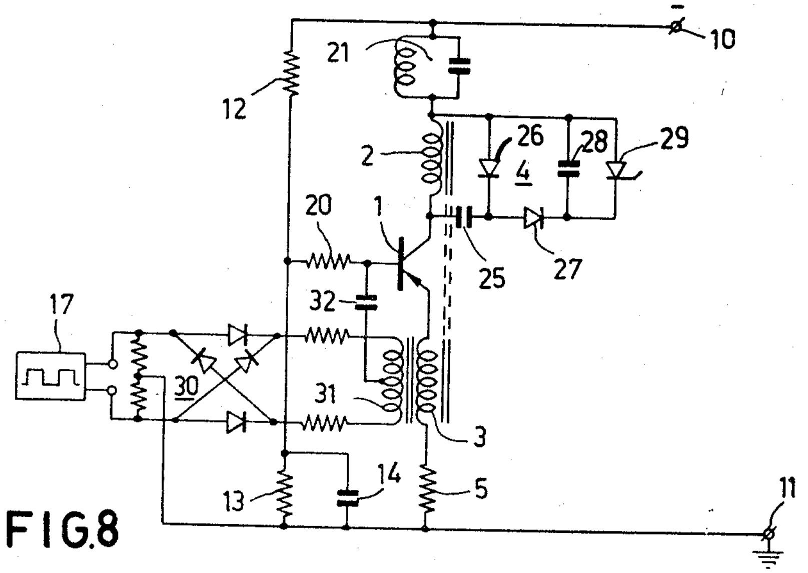
FIG. 8 shows another arrangement according to the invention which is designed as a frequency divider, the operation of which is clarified by several time diagrams shown in FIG. 9.

The arrangement described also permits obtaining even instead of odd factors of division by making the relaxation oscillation unsymmetrical, for example, by making the limit levels unequal. However, in connection with the simple possibility of selection and the obtaining of great factors of division, it is of special advantage to produce an even division with a symmetrical waveform of the relaxation oscillation. This object is attained with the arrangement shown in FIG. 8.

Figure 9:
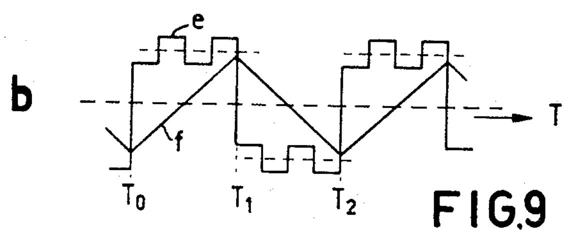

In this arrangement the synchronizing signal from the generator 17 is applied to the base of transistor 1 via an electronic switch in the form of a ring modulator 30. The modulator is controlled by the emitter current by means of an auxiliary coil 31 inductively coupled to the series-coil 3 in the emitter circuit. Depending upon the relaxation current flowing in the emitter circuit of transistor 1, the synchronizing signal from generator 17 which is fed to the ring modulator 30 will be applied with the same polarity or with opposite polarity to the base of transistor 1 via a blocking capacitor 32 connected to a center tap on the auxiliary coil 31. This change in polarity of the synchronizing signal with a symmetrical waveform of the relaxation oscillation produced causes an even factor of division, as will now be illustrated with reference to the time diagrams shown in FIG. 9.

FIG. 9*a* shows the synchronizing signal applied to the ring modulator 30, the curves *e* and *f* in FIG. 9*b* illustrating respectively the collector current and the current flow in the series-coil 2. In the manner described hereinbefore, at the instant $T_1$ of intersection of the curves *f* and *e* the relaxation generator will switch from the unstable condition with maximum collector current to the unstable condition with minimum collector current, thus also causing the synchronizing signal to be changed in polarity. At the next instant $T_2$ of intersection of the curves *f* and *e* the relaxation generator will switch from the unstable condition with minimum collector current to the unstable condition with maximum collector current so that the synchronizing signal is likewise changed in polariy relative to the preceding time interval $T_1$—$T_2$, whereafter the cycle described is repeated.

As may readily be seen from FIG. 9*a* and 9*b*, if the relaxation oscillation produced has a symmetrical waveform, a frequency division by an even factor of division is obtained by the change in polarity of the synchronizing signal effected by means of the electronic switch 30, and more particularly the factor of division is then 4, the divided frequency desired being selected by means of the oscillatory circuit 21 included in the collector circuit. All the advantages of the division by an odd factor of division as have been mentioned with the embodiment of FIG. 4 namely simple possibility of selection, no phase jitter and the obtaining of great factors of division, are here also obtained by using the arrangement of FIG. 8. For the sake of completeness, it is to be noted that, under certain conditions, a sinusoidal synchronizing signal can be used instead of a square wave synchronizing signal.

In addition to being used as a frequency divider, the relaxation generator described can also advantageously be used as an FM modulator by using a variable resistor for the resistor 5 included in the emitter circuit, since, as readily follows from the formula for the natural frequency F of the relaxation generator:

$$F=\frac{n^2}{4(n-1)}\frac{R}{L}$$

the frequency will vary linearly with the magnitude of the said resistor. Thus not only a linear frequency sweep is obtained over a very large range of frequencies, but also the amplitude of the output oscillation is constant due to the bilateral limitation, and at the same time the desired frequency multiplication is obtained by selection of a higher harmonic of the relaxation oscillation produced.

What is claimed is:

1. An astable relaxation oscillator arrangement comprising a transistor having input, common and collector electrodes, a collector circuit, means connecting said collector circuit between the collector electrode of said transistor and a reference point, said collector circuit including a series-coil, an input circuit connected between the input and common electrodes of said transistor, means connecting a point on said input circuit to a reference point, means for inductively backcoupling said series coil to said input circuit, and a bilateral voltage limiter circuit connected in shunt with said series-coil for limiting the voltage across said series-coil to predetermined maximum and minimum values, said input circuit including a series resistor for limiting collector electrode current in said transistor.

2. An oscillator as claimed in claim 1, characterized in that the transistor is circuited in common base connection, and said input circuit comprises a source of a direct bias voltage, and means applying said bias voltage between the input and common electrodes of the transistor.

3. An oscillator as claimed in claim 1, characterized in that the limit levels of the bilateral limiter are of the same magnitude and of opposite polarities.

4. As oscillator as claimed in claim 1, characterized in that the bilateral voltage limiter connected in parallel with the series-coil is comprised of two parallel branches each including a diode and bias means connected to bias the respective diode, the two diodes being included in the parallel branches with relatively opposite pass directions.

5. An oscillator as claimed in claim 4, characterized in that the two bias means in the parallel branches of the bilateral limiter are each formed by a Zener diode connected in series with the respective diode and Zener current pass direction of which coincides with the pass direction of the diode connected in series therewith.

6. An oscillator as claimed in claim 1, characterized in that the bilateral limiter is comprised of two diodes having like electrodes connected to the opposite ends of the series-coil and a Zener diode connected between a center tap on the series-coil and the other electrodes of said two diodes, the Zener pass direction of said Zener diode coinciding with that of said two diodes.

7. An oscillator as claimed in claim 1, characterized in that the bilateral limiter is comprised of the series-combination of a first capacitor and a first diode connected in shunt with the series-coil included in the collector circuit, and the series-combination of a second capacitor and a second diode connected in parallel with the first diode, the diodes and the capacitors of the two series-combinations forming a voltage-doubling circuit, and a Zener diode connected in shunt with the second capacitor.

8. An oscillator as claimed in claim 1, designed as a frequency divider of a generator frequency, comprising a generator connected to one of said input and common electrodes of the transistor, and a frequency selective circuit connected in series with the series-coil in the collector circuit.

9. An oscillator as claimed in claim 8, wherein said common electrode is a base electrode characterized in that the generator is connected to a series-resistor connected in series with the base electrode of the transistor.

10. An oscillator as claimed in claim 8 comprising electronic switch means for connecting the generator to said one electrode of the transistor, and means for controlling said electronic switch means with an output of said oscillator.

11. An oscillator as claimed in claim 10, characterized in that the electronic switch means is comprised of a ring modulator having an auxiliary coil connected to the control terminals of said modulator and inductively coupled to said series coil of the oscillator, and means connecting a center tap on the auxiliary coil to said one electrode of the transistor.

12. As oscillator as claimed in claim 1, characterized in that the series resistor included in said input circuit of the transistor is variable.

13. An astable relaxation oscillator comprising an amplifier device having input, and output electrodes, a transformer having a primary winding inductively coupled to a secondary winding, means connecting said primary winding between said output electrode and a reference point, means connecting said secondary winding between said input electrode and a reference point to provide positive feedback, a bilateral voltage limiting circuit connected in parallel with said primary winding for limiting the maximum positive and negative amplitudes of voltage across said primary winding, bias circuit means, and means coupling said bias circuit means between said input and common electrodes for biasing said device to be continuously conductive.

14. An astable relaxation oscillator comprising a transistor having input, common and output electrodes whereby output electrode current flow is substantially equal to the current flow of one of said input and common electrodes, a source of potential having first and second terminals, series coil means, means connecting said series coil means between said output electrode and said first terminal, means connecting said one electrode to said second terminal, means connected to provide a bias between said input and common electrodes whereby said transistor continuously conducts output electrode current, means inductively regeneratively coupling said series coil to said input electrode, and bilateral voltage limiting means connected in shunt with said series coil means for limiting the voltage across said series coil means to predetermined minimum and maximum values.

15. The oscillator of claim 14 wherein said input, common and output electrodes are emitter, base and collector electrodes, said means connecting said one electrode to said second terminal comprises resistor means for limiting the collector current flow of said transistor, and said means inductively coupling said series coil comprises a winding inductively coupled to said series coil means and connected in series with said resistor means.

16. In an astable relaxation oscillator of the type including an amplifier device having input, common and output electrodes, an input circuit coupled between said input and common electrodes, an output circuit coupled between said output and common electrodes, wherein said output circuit includes a coil, and wherein said oscillator comprises means for regeneratively inductively coupling said coil to said input circuit to produce relaxation oscillations, the improvement comprising bilateral limiting means connected to said coil for limiting the minimum and maximum voltages across said coil, said input circuit comprising a source of bias potential connected to apply a bias voltage between said input and common electrodes of sufficient amplitude that said device continuously conducts output electrode current, and wherein said coupling means feeds back oscillations to said input circuit of an insufficient amplitude to produce output electrode saturation of said device.

References Cited

UNITED STATES PATENTS

| | | | |
|---|---|---|---|
| 3,040,185 | 6/1962 | Horton | 307—88.5 |
| 3,071,701 | 1/1963 | Perreault | 331—112 X |

ROY LAKE, *Primary Examiner.*

SIEGFRIED H. GRIMM, *Assistant Examiner.*

U.S. Cl. X.R.

307—220, 275; 321—69; 331—109, 146; 332—29